US 008184153B2

(12) United States Patent
Kang et al.

(10) Patent No.: US 8,184,153 B2
(45) Date of Patent: May 22, 2012

(54) METHOD AND APPARATUS FOR DEFINING AND RECONSTRUCTING ROIS IN SCALABLE VIDEO CODING

(75) Inventors: Jung Won Kang, Seoul (KR); Jae Gon Kim, Daejeon (KR); Jin Woo Hong, Daejeon (KR); Yong Man Ro, Daejeon (KR); Tae Meon Bae, Daegu (KR); Cong Thang Truong, Daejeon (KR)

(73) Assignees: Electronics and Telecommunications Research Institute, Daejeon (KR); Research and Industrial Cooperation Group, Daejeon (KR)

( * ) Notice: Subject to any disclaimer, the term of this patent is extended or adjusted under 35 U.S.C. 154(b) by 1032 days.

(21) Appl. No.: 12/067,960

(22) PCT Filed: Sep. 25, 2006

(86) PCT No.: PCT/KR2006/003794
§ 371 (c)(1),
(2), (4) Date: May 1, 2008

(87) PCT Pub. No.: WO2007/035065
PCT Pub. Date: Mar. 29, 2007

(65) Prior Publication Data
US 2008/0225116 A1 Sep. 18, 2008

(30) Foreign Application Priority Data

Sep. 26, 2005 (KR) .................. 10-2005-0089463
Sep. 22, 2006 (KR) .................. 10-2006-0092368

(51) Int. Cl.
*H04N 7/18* (2006.01)

(52) U.S. Cl. ................................................ 348/135
(58) Field of Classification Search .............. 348/135
See application file for complete search history.

(56) References Cited

U.S. PATENT DOCUMENTS

| 6,088,061 A | 7/2000 | Katata et al. |
| 6,507,618 B1 | 1/2003 | Wee et al. |
| 8,019,175 B2 * | 9/2011 | Lee et al. ................ 382/282 |
| 2003/0112867 A1 | 6/2003 | Hannuksela et al. |
| 2004/0006575 A1 * | 1/2004 | Visharam et al. ........... 707/104.1 |
| 2006/0256851 A1 * | 11/2006 | Wang et al. ............. 375/240.01 |
| 2006/0256863 A1 * | 11/2006 | Wang et al. ............. 375/240.08 |
| 2009/0279602 A1 * | 11/2009 | Wang ....................... 375/240.02 |

OTHER PUBLICATIONS van der Schaar et al. Robust Fine-Granularity-Scalabity for Wireleass Video,In IEEE/Eurasip Packet Video,2002.*
Hannuksela et al. "Sub-Picture: ROI Coding and Unequal Error Protection" IEEE 2002.*

(Continued)

*Primary Examiner* — Larry Donaghue
(74) *Attorney, Agent, or Firm* — Ladas & Parry LLP (57) ABSTRACT

A multiple ROI (region of interest) setting method and apparatus in scalable video coding and an ROI reconstructing method and apparatus are provided. The multiple ROI setting apparatus includes: an ROI setting unit which sets at least one or more ROIs and allocates ROI identification numbers to the each of ROIs; a mapping unit which allocates at least one or more slice group identification numbers to the at least one or more ROI identification numbers; and a message generating unit which generates a message including ROI-associated information, slice-group-associated information, mapping information on mapping of the ROI identification number to the at least one or more slice group identification numbers, and scalability information.

45 Claims, 11 Drawing Sheets

OTHER PUBLICATIONS

Wiegand et al., Overview of the H.264/AVC Video Coding Standard, IEEE 2003.*

Truong Cong Thang, et al; "Spatial Scalability of Multiple ROIs in Surveillance Video", Joint Video Team (JVT) of ISO/IEC MPEG & ITU-T VCEG (ISO/IEC JTC/SC29/WG11 and ITU-t SG16 Q.6) 15th Meeting: Busan KR, Apr. 16-22, 2005, pages; pp. 1-10.

International Search Report—mailed Jan. 8, 2008, PCT/KR2006/003794.

Truong Cong Thang, et al; "SVC CE8 report: Spatial scalability of multiple ROIs", Joint Video Team (JVT) of ISO/IEC MPEG & ITU-T VCEG (ISO/IEC JTC1/SC29/WG11 and ITU-T SG16 Q.6) 16th Meeting; Poznan, Poland Jul. 24-29, 2005, pp. 2-21.

Ye-Kui Wang; "Scalability information SEI for SVC", Joint Video Team (JVT) of ISO/IEC MPEG & ITU-T VCEG (ISO/IEC JTC1/SC29/WG11 and ITU-T SG16 Q.6) 15th Meeting: Busan, Korea, Apr. 16-22, 2005, pp. 2-7.

* cited by examiner

| scalability_info( payloadSize ) { | C | Descriptor |
|---|---|---|
| num_layers_minus1 | 5 | ue(v) |
| for( i = 0; i <= num_layers_minus1; i++ ) { | | |
| layer_id[ i ] | 5 | u(8) |
| simple_priority_id[ i ] | 5 | u(6) |
| discardable_flag[ i ] | 5 | u(1) |
| temporal_level[ i ] | 5 | u(3) |
| dependency_id[ i ] | 5 | u(3) |
| quality_level[ i ] | 5 | u(2) |
| sub_pic_layer_flag[ i ] | 5 | u(1) |
| sub_region_layer_flag[ i ] | 5 | u(1) |
| iroi_slice_division_info_present_flag[i] | 5 | u(1) |
| profile_level_info_present_flag[ i ] | 5 | u(1) |
| bitrate_info_present_flag[ i ] | 5 | u(1) |
| frm_rate_info_present_flag[ i ] | 5 | u(1) |
| frm_size_info_present_flag[ i ] | 5 | u(1) |
| layer_dependency_info_present_flag[ i ] | 5 | u(1) |
| init_parameter_sets_info_present_flag[ i ] | 5 | u(1) |
| exact_interlayer_pred_flag[ | 5 | u(1) |
| if (profile_level_info_present_flag[i]) { | | |
| llayer_profile_idc[i] | 5 | u(8) |
| layer_constraint_set0_flag[i] | 5 | u(1) |
| layer_constraint_set1_flag[i] | 5 | u(1) |
| layer_constraint_set2_flag[i] | 5 | u(1) |
| layer_constraint_set3_flag[i] | 5 | u(1) |
| reserved_zero_4bits /* equal to 0 */ | 5 | u(4) |
| layer_level_idc[i] | 5 | u(8) |
| } else | | |
| profile_level_info_src_layer_id_delta [i] | | ue(v) |
| if( bitrate_info_present_flag[i]) { | | |
| avg_bitrate[i] | 5 | u(16) |
| max_bitrate_layer[i] | 5 | u(16) |
| max_bitrate_decoded_picture[i] | 5 | u(16) |
| max_bitrate_calc_window[i] | 5 | u(16) |
| } | | |
| if( frm_rate_info_present_flag[i]) { | | |
| constant_frm_rate_idc[i] | 5 | u(2) |
| avg_frm_rate[i] | 5 | u(16) |
| } else | | |
| frm_rate_info_src_layer_id_delta[i] | 5 | ue(v) |
| if( frm_size_info_present_flag[i] \|\| iroi_slice_division_info_present_flag[i]) { | | |
| frm_width_in_mbs_minus1[i] | 5 | ue(v) |
| frm_height_in_mbs_minus1[i] | 5 | ue(v) |

FIG. 10B

| | | |
|---|---|---|
| } else | | |
|     frm_size_info_src_layer_id_delta[i] | 5 | ue(v) |
| if( sub_region_layer_flag[ i ] ) { | | |
|     base_region_layer_id[ i ] | 5 | u(8) |
|     dynamic_rect_flag[ i ] | 5 | u(1) |
|     if( dynamic_rect_flag[ i ] ) { | | |
|         horizontal_offset[ i ] | 5 | u(16) |
|         verticial_offset[ i ] | 5 | u(16) |
|         region_width[ i ] | 5 | u(16) |
|         region_height[ i ] | 5 | u(16) |
|     } | | |
| } else | | |
|     sub_region_info_src_layer_id_delta[i] | 5 | ue(v) |
| if( sub_pic_layer_flag[] ) | | |
|     roi_id [i] | 5 | u(3) |
| if ( iroi_slice_division_info_present_flag[i] ) { | | |
|     iroi_slice_division_type[i] | 5 | u(2) |
|     if ( iroi_slice_division_type[i]== 0 ) { | | |
|         grid_slice_width_in_mbs_minus1[i] | 5 | ue(v) |
|         grid_slice_height_in_mbs_minus1[i] | 5 | ue(v) |
|     } else if ( iroi_slice_division_type[i] == 1 ) { | | |
|         num_slice_minus1[i] | 5 | ue(v) |
|         for (j = 0; j <= num_slice_minus1[i]; j++ ) { | | |
|             first_mb_in_slice[i] | 5 | ue(v) |
|             slice_width_in_mbs_minus1[i] | 5 | ue(v) |
|             slice_height_in_mbs_minus1[i] | 5 | ue(v) |
|         } | | |
|     } else if ( iroi_slice_division_type[i] == 2 ) { | | |
|         num_slice_minus1[i] | 5 | ue(v) |
|         for (j = 0; j <PicSizeInMbs[i]; j++ ) { | | |
|             slice_id[i][j] | 5 | u(v) |
|         } | | |
|     } | | |
| } | | |
| if( layer_dependency_info_present_flag[i]) { | | |
|     num_directly_dependent_layers[i] | 5 | ue(v) |
|     for( j = 0; j < num_directly_dependent_layers[i]; j++ ) | | |
|         directly_dependent_layer_id_delta _minus1[ i ][ j ] | 5 | ue(v) |
| } else | | |
|     layer_dependency_info_src_layer_id_delta[i] | 5 | ue(v) |

FIG. 10C

| | | |
|---|---|---|
| if( init_parameter_sets_info_present_flag[i]) { | | |
| num_ init_seq_parameter_set_minus1[i] | 5 | ue(v) |
| for( j = 0; j <= num_seq_parameter_set_minus1[i]; j++ ) | | |
| init_seq_parameter_set_id_delta[ i ][ j ] | 5 | ue(v) |
| num_ init_pic_parameter_set_minus1[i] | 5 | ue(v) |
| for( j = 0; j <= num_pic_parameter_set_minus1[i]; j++ ) | | |
| init_pic_parameter_set_id_delta[ i ][ j ] | 5 | ue(v) |
| } else | | |
| init_parameter_sets_info_src_layer_id_delta[i] | 5 | ue(v) |
| } | | |
| } | | |

FIG. 11

| | C | Descriptor |
|---|---|---|
| scalability_info_layers_notpresent( payloadSize ) { | | |
| num_layers | 5 | ue(v) |
| for( i = 0; i < num_layers; i++ ) { | | |
| layer_id[ i ] | 5 | u(8) |
| } | | |
| } | | |

FIG. 12

METHOD AND APPARATUS FOR DEFINING AND RECONSTRUCTING ROIS IN SCALABLE VIDEO CODING

TECHNICAL FIELD

The present invention relates to a method of supporting a new function of encoding and decoding multiple regions of interest (ROIs) in scalable video coding (SVC), and more particularly, to a method of defining multiple ROIs in SVC and independently decoding the multiple ROIs with scalabilities provided in the SVC.

BACKGROUND ART

As an example of ROIs implemented in a moving picture codec, there are H.263-based encoding and an MPEG-4 object-based encoding. An independent segment decoding (ISD) mode which provides a method of independently decoding a specific region in the H.263 is the same as the MPEG-4 object-based encoding from the point of view that the region that is to—be—independently decoded is treated as one full image in the encoding. However, the ISD mode is different from the MPEG-4 object-based encoding as follows.

1. ISD Mode in H.263

In H.263-based encoding, a method of independently decoding a specific region in an image is provided as an option (see Annex R of H.263). In particular, in the H.263-based encoding, spatial, temporal, and quality scalabilities can be provided by using scalable hierarchical coding.

In the H.263, the quality scalability is provided by using a method corresponding to coarse grain scalability (CGS) of SVC, and the temporal scalability is provided by using a method corresponding to fine grain scalability (FGS) and supporting a variable frame. In addition, in the case of the spatial scalability, similarly to scalable video decoding (SVD), coding is performed in terms of resolutions, and inter-layer coding is performed by using an image having a lower resolution.

2. MPEG-4 Object-Based Coder

In the MPEG-4 object-based coding, an object region having an arbitrary form is coded into a rectangular region defined by a video object plane (VOP). According to this method, similar to the ROI, a specific region in an image is coded in such a way that it can be independently decoded.

The SVC based on the H.264-based encoding has a higher coding rate than H.263 and MPEG-4, and a coding scheme in the SVC is different from those of H.263 and MPEG-4.

DETAILED DESCRIPTION OF THE INVENTION

Technical Problem

The present invention provides a method of representing regions of interest (ROIs) suitable for scalable video coding (SVC).

Technical Solution

According to an aspect of the present invention, there is provided a multiple ROI (region of interest) setting apparatus comprising: an ROI setting unit which sets at least one or more ROIs and allocates ROI identification numbers to the each of ROIs; a mapping unit which allocates at least one or more slice group identification numbers to the at least one or more ROI identification numbers; and a message generating unit which generates a message including ROI-associated information, slice-group-associated information, mapping information on mapping of the ROI identification number to at least one or more slice group identification numbers, and scalability information.

The multiple ROI setting apparatus may further comprise a selecting unit which selects a bitstream having a specific ROI with a specific scalability from bitstreams based on the message.

In addition, when there is an overlapped region between the ROIs, the mapping unit may allocate the each of slice group identification numbers to the overlapped region and a region of the ROI that does not overlap other ROIs.

In addition, the selecting unit may detect a slice group corresponding to a slice group identification number which is mapped to the specific ROI identification number from the bitstream based on the information in the message, removes an NAL unit where the detected slice group does not exist, and removes a NAL unit which has a scalability higher than a specific scalability.

According to another aspect of the present invention, there is provided an ROI selecting apparatus comprising: a receiving unit which receives a bitstream having a message including mapping information which allocates at least one or more slice groups to at least one or more ROIs set, ROI-associated information, slice-group-associated information, and scalability information; and a selecting unit which selects a bitstream corresponding to a specific ROI with a specific scalability from the bitstreams based on the message.

The mapping information may include information on allocation of ROI identification numbers to at least one or more ROIs and information on allocation of slice group identification numbers representing at least one or more slice groups to the ROI identification numbers.

In addition, when there is an overlapped region between the ROIs, the slice group identification numbers may be allocated to the overlapped region and a region of the ROI that does not overlap other ROIs.

According to another aspect of the present invention, there is provided a selective ROI reconstructing apparatus comprising: a receiving unit which receives a bitstream having a message including mapping information which allocates at least one or more slice groups to at least one or more ROIs set ROI-associated information, slice-group-associated information, and scalability information; a selecting unit which selects a bitstream corresponding to a specific ROI with a specific scalability from the bitstreams based on the message; and a decoding unit which decodes the selected bitstream.

According to another aspect of the present invention, there is provided a multiple ROI (region of interest) setting method comprising: (a) setting at least one or more ROIs and allocating ROI identification numbers to each of ROIs; (b) mapping at least one or more slice group identification numbers to at least one or more ROI identification numbers; and (c) generating a message including ROI-associated information, slice-group-associated information, mapping information on mapping of the ROI identification number to the at least one or more slice group identification numbers and scalability information.

The multiple ROI setting method may further comprise (d) selecting a bitstream having a specific ROI with a specific scalability from bitstreams based on the message.

According to another aspect of the present invention, there is provided an ROI selecting method comprising: (a) receiving a bitstream having a message including mapping information on mapping which allocates at least one or more slice groups to at least one or more ROIs set, ROI-associated information, slice-group-associated information and scalability information; and (b) selecting a bitstream corresponding to a specific ROI with a specific scalability from the bitstreams based on the message.

According to another aspect of the present invention, there is provided a selective ROI reconstructing method comprising: (a) receiving a bitstream having a message including mapping information on mapping which allocates at least one or more slice groups to at least one or more ROIs set, ROI-associated information, slice-group-associated information, and scalability information; (b) selecting a bitstream corresponding to a specific ROI with a specific scalability from the bitstreams based on the message; and (c) decoding the selected bitstream.

BEST MODE

Recently, scalable video coding (SVC) has been used as an important technique for transmitting video in heterogeneous environments. In SVC, a specific portion is removed from an encoded bitstream according to a situation in a user's terminal or a network, so that a bitstream having different temporal, spatial, and quality characteristics can be generated.

The present invention provides a method of extracting a new bitstream having a specific region of interest (ROI) in a scalable video stream having one or more ROIs in addition to the aforementioned features of the existing SVC.

Due to this method, a user can watch a video with the highest resolution possible for a user's apparatus such as a mobile phone or a PDA in which resolution and display size are limited.

When a network or a terminal are limited in terms of size, only the region of interest (ROI) that has important meaning in the video is transmitted, so that a video streaming service capable of ensuring quality of server (QoS) can be provided. Now, an example thereof is described with reference to FIG. 1.

Figure 1:
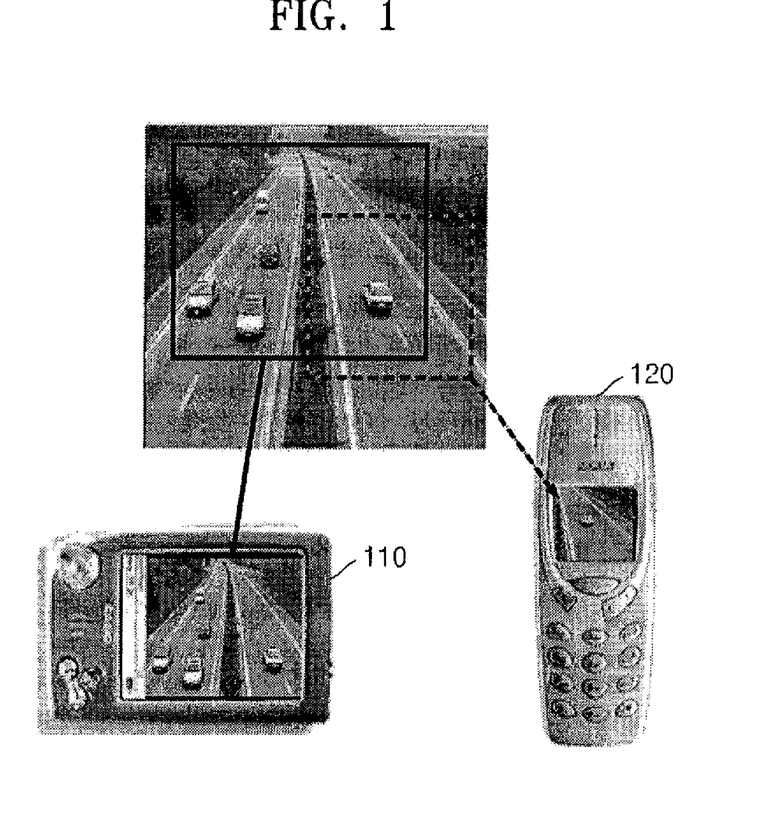
FIG. 1 shows a traffic monitoring window displayed on a screen of a mobile phone or a PDA according to an embodiment of the present invention.

FIG. 1 shows a traffic monitoring window displayed on a screen of a mobile phone or a PDA according to an embodiment of the present invention.

In such a mobile phone or PDA having low resolution, an original image of which resolution is processed so as to be lowered is received. However, in the present embodiment, only the ROI defined as 110 or 120 is received and output, so that the ROI suitable for the terminal can be viewed.

Implementation of Multiple ROIs in SVC

When one or more ROIs are defined, two factors are taken into consideration so as to represent the ROIs.

1) One or more ROIs may be provided so as to have different scalabilities in a scalable video bitstream.

2) An overlapped region may exist between two ROIs, and the overlapped region may decrease an encoding rate. In the present embodiment, independent ROIs are constructed by using flexible macroblock ordering (FMO) in accordance with H.264/AVC.

1. Encoding and Decoding of ROI by Using FMO

Figure 2:
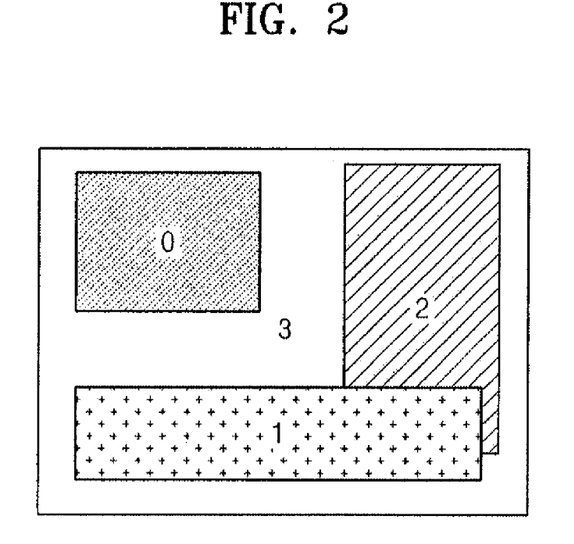
FIG. 2 shows four slice groups defined in a type 2 slice group map.

Now, implementation of the ROI in the SVC according to an embodiment of the present invention will be described. In the embodiment of the present invention, the ROIs are defined as slice groups by using FMO according to a type 2 slice group map among various slice group map types. FIG. 2 shows four slice groups defined in the type 2 slice group map. It should be noted that, the aforementioned type is just an example, but the present invention includes all the modifications and changes thereof.

Figure 3:
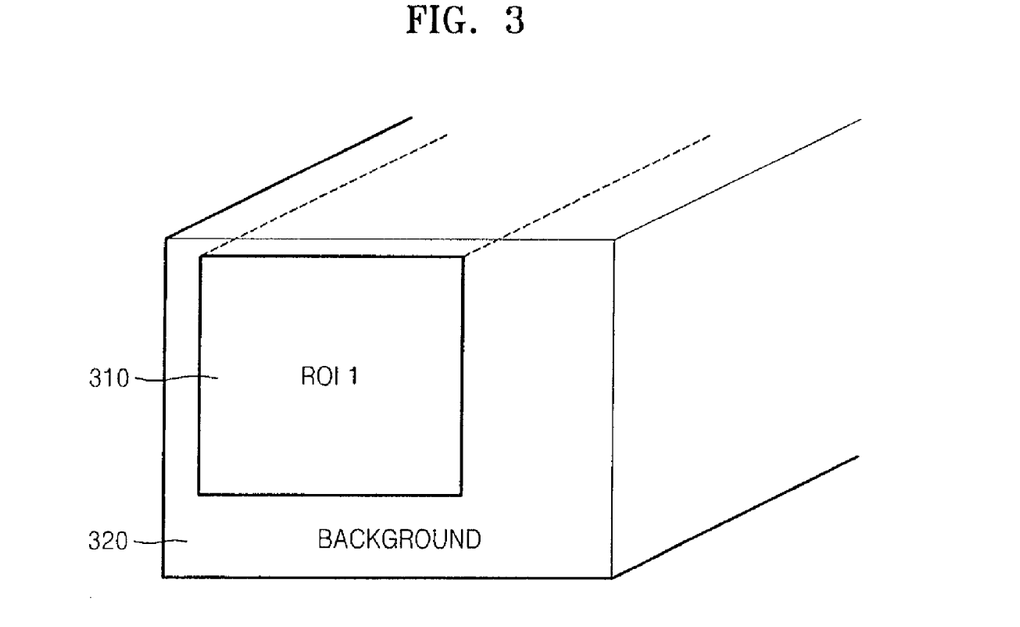
FIG. 3 shows an example where one region of interest (ROI) exists.

FIG. 3 shows an example where one ROI exists.

Macroblocks which exist outside the ROI in the frame are defined as another slice group. If only one ROI exists, the ROI 310 becomes slice group 1, and the background thereof becomes slice group 2.

Each macroblock in the frame is allocated with the slice group ID of the slice group in which the macroblock is included. Each macroblock is allocated with one slice group ID. In the SVC, the encoding of a frame is performed in units of slice groups.

When a specific slice group is encoded, only the macroblocks in the frame having the same slice group ID of the specific slice group are encoded. In the encoding, in a picture parameter set, the total number of slice groups and the slice group IDs are represented, and addresses of the macroblocks in upper left and lower right corners of each slice group are recorded. This information is used for encoding which is performed in units of slices.

2. Implementation of Multiple ROI by Using FMO

Figure 4:
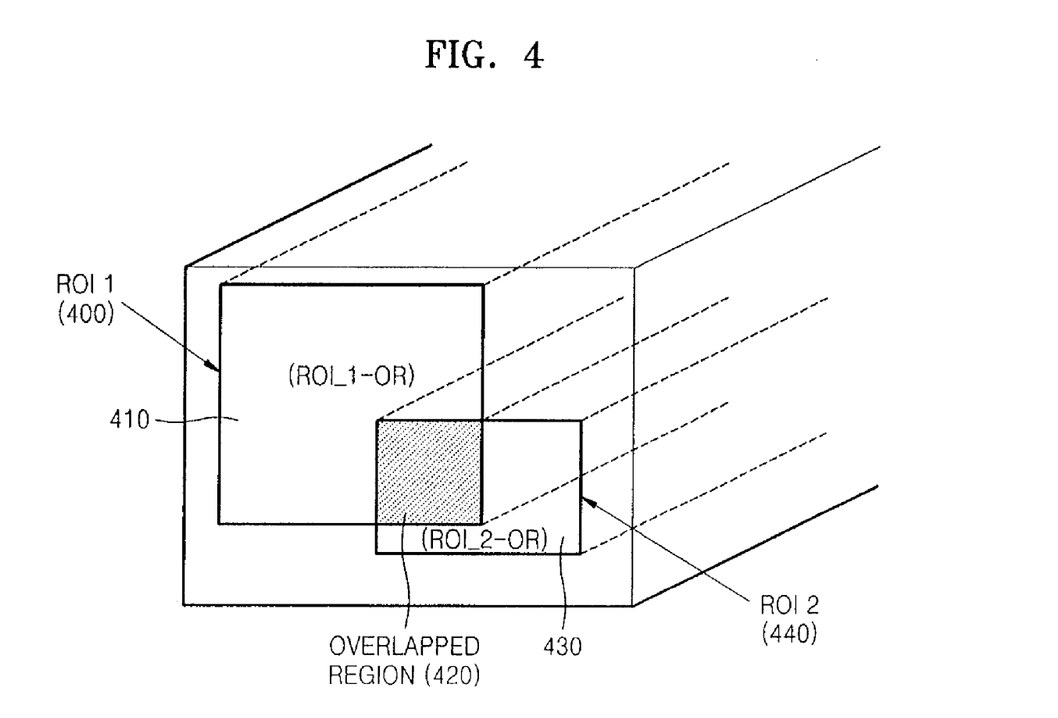
FIG. 4 shows an example where two ROIs having an overlapped region exist.

FIG. 4 shows an example where two ROIs having an overlapped region exist.

Unlike the case shown in FIG. 3 where only one ROI exists in one frame, in the case of multiple ROIs, a plurality of ROIs exist. Therefore, the overlapped region between the ROIs needs to be taken into consideration.

For example, as shown in FIG. 4, ROI_1 400 and ROI_2 440 may be defined. In this case, by using the FMO, the ROI_1 400 and the ROI_2 440 are defined as separate slice groups. Therefore, the overlapped region included in the ROI_1 400 and the ROI_2 440 may be included in one of the slice groups where the ROI_1 400 or the ROI__2 440 is included.

In this case, there are the following problems. The overlapped region 420 is included in a slice group having a slice group ID that is lower among the ROI_1 400 and the ROI_2 440. For example, when the slice group ID of the ROI_1 400 is 0 and the slice group ID of the ROI_2 440 is 1, the macroblocks in the overlapped region is included in the ROI_1 400.

In the resultant encoding, the ROI_1 400 is encoded so as to maintain the original regions 410 and 420. However, the ROI_2 440 is encoded so that only the region 430 excluding the overlapped region is allocated as the ROI_2. In such circumstances, when the user decodes only the ROI_2 440 from the encoded bitstream, only the region 430 of the ROI_2 440 excluding the overlapped region is encoded so as to be viewed in the encoder.

In order to solve this problem, according to an embodiment of the present invention, the overlapped region OR 420 between the ROI_1 400 and the ROI_2 440 is defined as an independent slice group. Accordingly, the overlapped region 420 can be independently encoded and decoded. However, in order to satisfy a rule defined in the FMO, the slice group ID of the overlapped region needs to be lower than those of the ROI_1 400 and the ROI_2 440.

When the user desires to view the ROI_1 400, the overlapped region 420 and the region 410 of the ROI_1 400 excluding the overlapped region 420 are encoded and decoded. When the user desires to view the ROI_2 440, the overlapped region 420 and the region 430 of the ROI_2 440 excluding the overlapped region 420 are encoded and decoded. As a result, suitable video can be viewed.

Figure 5A:
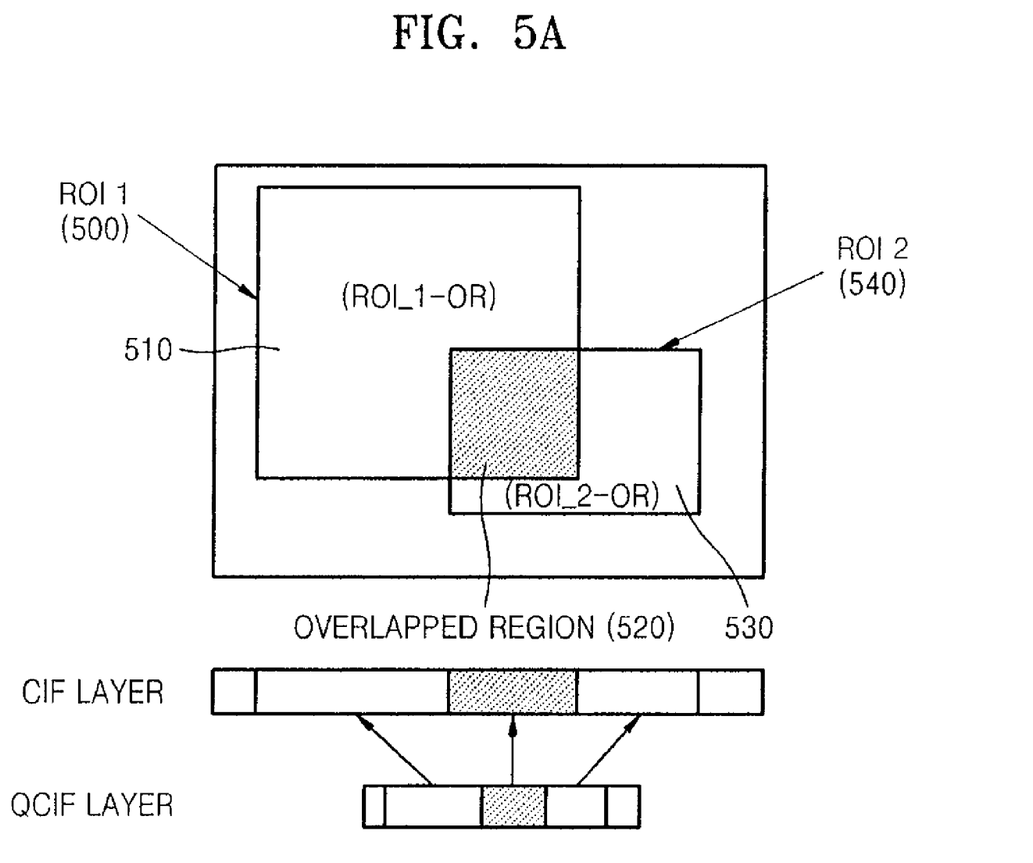
FIG. 5A shows an example where the ROIs of FIG. 4 are implemented by using flexible macroblock ordering (FMO).

FIG. 5A shows an example where the ROIs shown in FIG. 4 are implemented by using FMO.

As an example, an original video has a common image format (CIF) size, and a user may desire to view the ROI_1 500 in its original size, that is, the CIF size and the ROI_2 540 at half its original size (resolution), that is, the quarter CIF (QCIF) size. In this case, in order to encode the ROI_1 500 and the ROI_2 540, an encoder performs encoding in all the scalability layers (QCIF, CIF, 4CIF). More specifically, the encoder encodes a region ROI_1-OR 510 of the ROI_1 500 excluding the overlapped region, a region ROI_2-OR 530 excluding the overlapped region, and the overlapped region OR 520 as three independent slice groups.

Each slice group is in a shape of rectangle. The ROIs and overlapped region OR can be encoded by using the type 2 slice group map. In the present embodiment, the scalabilities increase or decrease by an integer multiple of 2.

As an example, as shown in FIG. 5A, in order to perform the decoding by taking the overlapped region OR into consideration, the slice group ID of the overlapped region OR needs to be lower than those of the ROI_1 500 and the ROI_2 540. Therefore, the slice group IDs of the overlapped region OR, the ROI_1, and the ROI_2 may be allocated with 0, 1, and 2, respectively.

3. Meta Data for Extracting ROI Bitstream

As shown in FIGS. 4 and 5A, when the multiple ROIs having the overlapped region are defined in a video by using the FMO, one ROI may be constructed with one or more slice groups. Accordingly, in order to extract a bitstream having a specific ROI, information indicating in which ROI each of the slice groups is included is required.

For example, two bitstreams having each ROI (ROI_1 and ROI_2) shown in FIGS. 4 and 5A can be extracted from an original bitstream. Each ROI may be decoded and displayed in a user's terminal. In this case, the ROIs may be displayed independently or simultaneously on one display unit or several display units.

In an embodiment of the present invention, in order to extract a bitstream having a specific ROI, meta data representing ROI information is defined as supplemental enhancement information (SEI) is provided to a scalable video bitstream. An SEI message including ROI-associated information includes the location and size of the ROI and the scalability of the ROI. Since necessary meta data is represented in the SEI, the information required for extraction of ROI can be transmitted to a bitstream extractor or a decoder. Main information included in a structure of the meta data representing the ROI is as follows.

Number of ROIs: the number of ROIs included in a bitstream

ROI ID: a value unique to an ROI, with which a user can select a specific ROI.

The following information is used for the corresponding spatial layer.

Slice Group ID: ID unique to a slice group

Size and Location of Slice Group: information on the size and location of a slice group, with which the size and location of an ROI can be recognized in a specific scalability Mapping of Slice group to ROI: information on mapping a slice group ID to a specific ROI ID.

In the current SVC, the ROI-associated information is represented by using three SEIs, that is, scalable information SEI, sub-picture scalable layer Information SEI, and motion-constrained slice group set SEI.

Figure 5B:
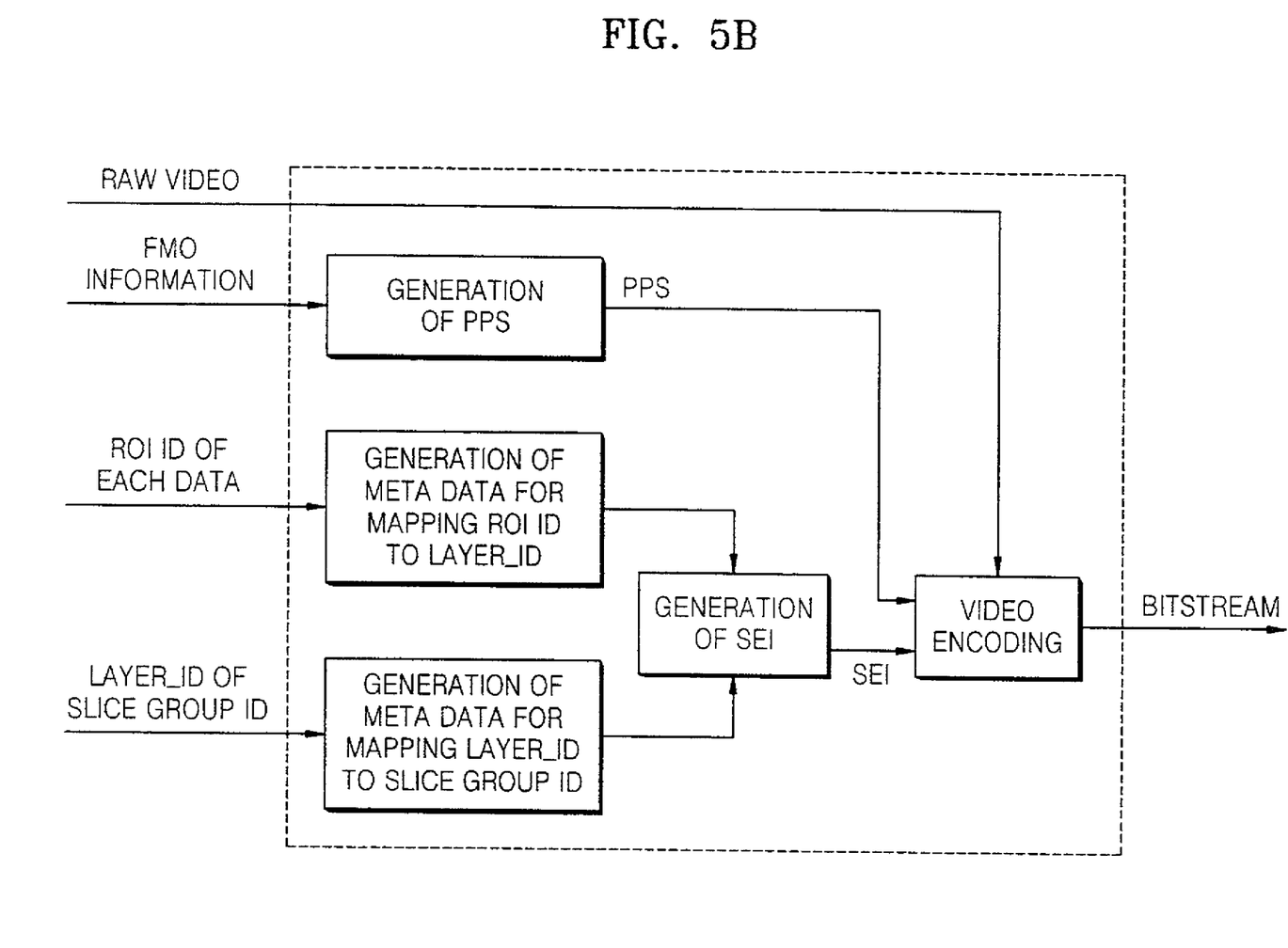
FIG. 5B shows a supplemental enhancement information (SEI) message generating operation for an SEI message including an ROI according to an embodiment of the present invention.

FIG. 5B shows an SEI message generating operation for an SEI message including an ROI.

A picture parameter set (PPS) is generated by using FMO information including information on slice groups. Layers corresponding to the slice groups are described in a form of SEI. At this time, the SEI including information used for mapping the ROI ID to the ROI-associated layer among the layers is generated. Next, the SEI including meta data representing information on the layer IDs linked to the slice group IDS is generated and inserted into a bitstream that is to be encoded.

4. Extraction of Bitstream Having ROI

Figure 6:
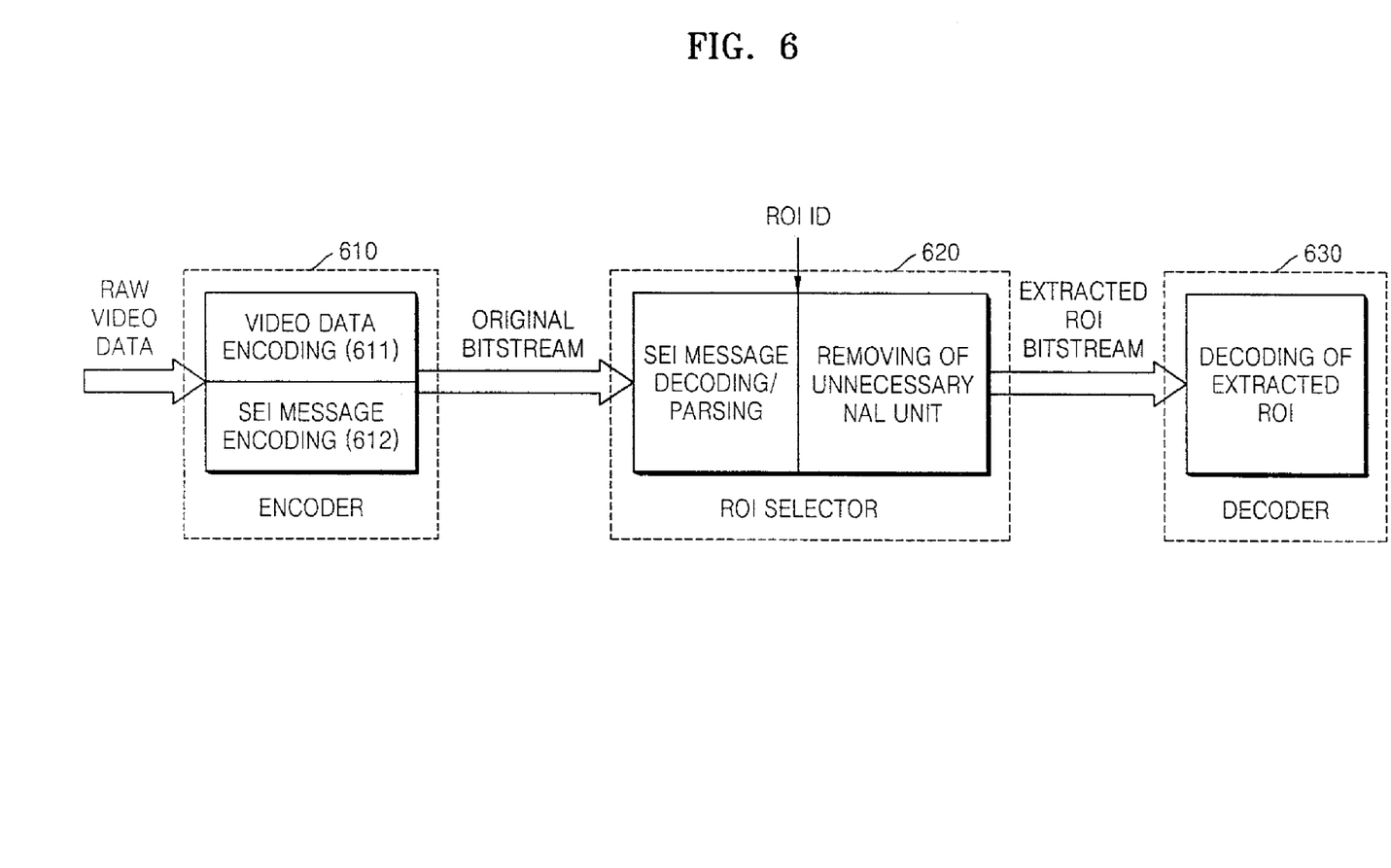
FIG. 6 is a schematic view showing ROI-based video communication, video encoding and decoding operations according to an embodiment of the present invention.

FIG. 6 is a schematic view showing ROI-based video communication, video encoding and decoding operations according to an embodiment of the present invention.

In an encoder 610, input video data is encoded into SVC Network Abstraction Layer (NAL) units (611). The ROI-associated information in the SVC bitstream included in the SEI message and the scalability information are also encoded into SEI NAL units (612). In transmission, the encoded SEI NAL units precede to the SVC NAL units containing encoded video data.

In a selecting unit 620, a bitstream having a specific ROI which is selected from the scalable video bitstream encoded in the encoder 610 is extracted. In a decoder 630, the bitstream constructed with the extracted NAL unit is decoded. Now, a method of extracting the bitstream having the ROI, which is performed in the selecting unit 620, will be described in detail with reference to FIGS. 7 and 8.

Figure 7:
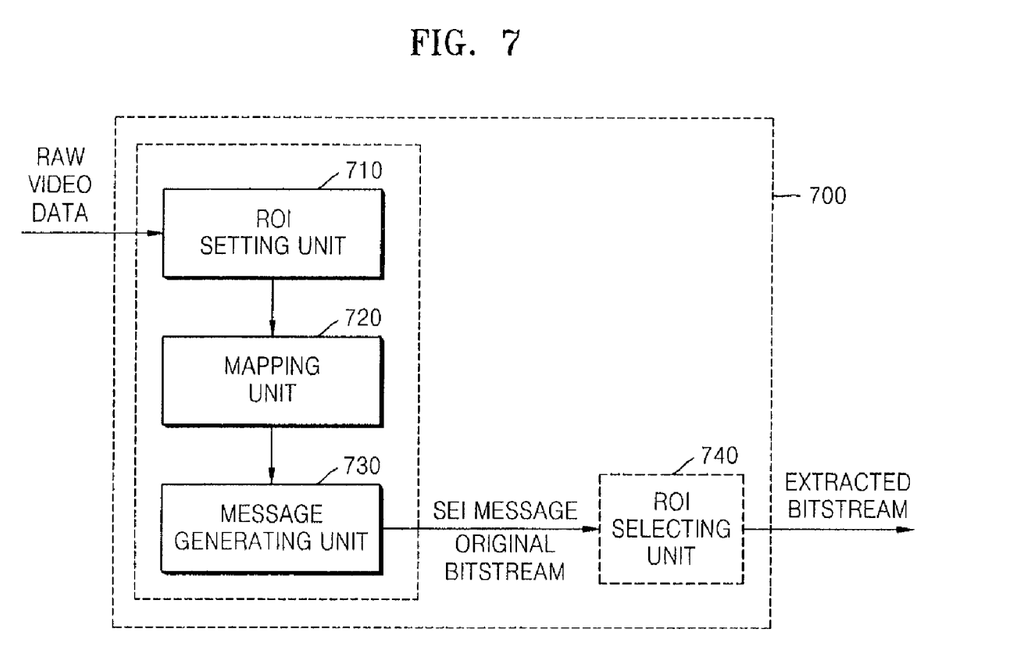
FIG. 7 is a view showing a construction of a multiple ROI setting apparatus according to an embodiment of the present invention.

FIG. 7 is a view showing a construction of a multiple ROI setting apparatus 700 according to an embodiment of the present invention. The multiple ROI setting apparatus 700 performs setting of the multiple ROIs in the SVC, encoding of the set ROIs, and generating of an SEI message for decoding the ROIs. In addition, the multiple ROI setting apparatus 700 may perform a function of extracting only the bitstream having the specific ROI.

The multiple ROI setting apparatus 700 includes an ROI setting unit 710, a mapping unit 720, and a message generating unit 730. The multiple ROI setting apparatus 700 may further include a selecting unit 740.

The ROI setting unit 710 sets at least one or more ROIs, so that the macroblock is set as at least one or more ROIs by using H.264 multiple slice group flexible macroblock ordering (FMO) and allocates the ROI IDs to the ROIs.

The mapping unit 720 allocates at least one or more slice group IDs to at least one or more ROI IDs. The mapping unit 720 maps the ROI IDs to the slice group IDs according to the operations shown in FIGS. 3 and 4.

When one or more ROIs exist in a video, IDs are used to identify the ROIs. Since the ROIs are meaningful regions, there is a need for a method of designating a specific spatial region irrespective of spatial resolutions. In the SVC, only the slice groups capable of representing a specific frame rate of a specific scalability can be designated with a layer_ID. In a bitstream extractor, the ROI ID is set so as to designate the specific ROI irrespective of the scalability and frame rate, and the slice group ID is set so as to represent the specific frame rate of the specific scalability. Then, mapping is performed.

The message generating unit 730 generates a message including the ROI-associated information, the slice-group-associated information, mapping information on mapping of the ROI IDs to one or more slice group IDs, and scalability information. The message is a supplemental enhancement information (SEI) message in H.264/AVC and SVC and is encoded in order to be included in a bitstream of an encoder. Since the SEI message is described in the section "3. Meta Data for Extracting ROI Bitstream" above, a detailed description of the SEI message is omitted.

The selecting unit 740 extracts a bitstream having a specific ROI with a specific scalability from the original bitstreams based on the SEI message generated by the message generating unit 730. The selecting unit 740 will now be described in detail with reference to FIG. 8.

Figure 8:
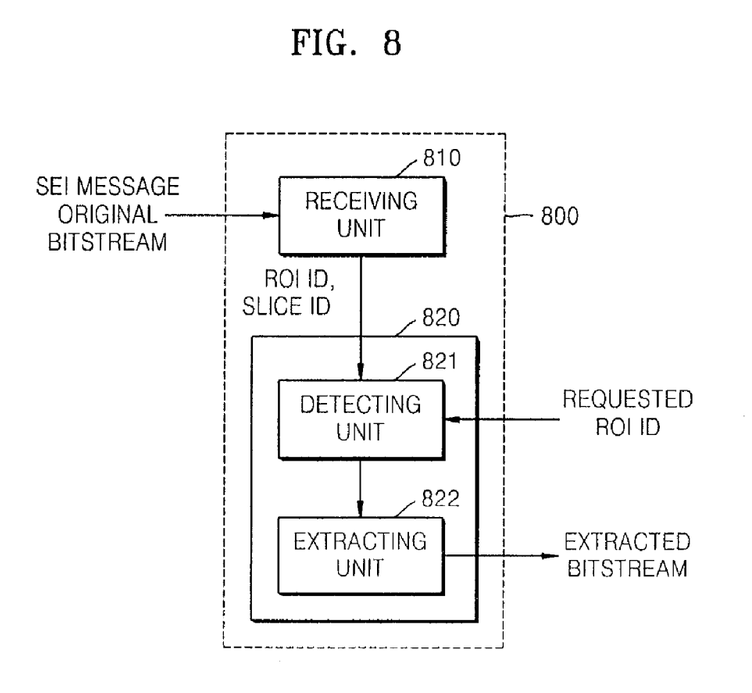
FIG. 8 is a view showing a construction of an ROI selecting apparatus according to an embodiment of the present invention.

FIG. 8 is a view showing a construction of an ROI selecting apparatus 800 according to an embodiment of the present invention.

The ROI selecting unit 800 includes a receiving unit 810 and a selecting unit 820. The receiving unit 810 receives a bitstream having a message including mapping information on mapping (which allocates at least one or more slice groups to at least one or more ROIs set, ROI-associated information, slice-group-associated information, and scalability information.

The selecting unit 820 can extract a bitstream having a specific ROI with a specific scalability from an input scalable video stream. The selecting unit 820 performs SEI message parsing in order to extract an ROI in an original bitstream so as to extract a bitstream corresponding to the specific ROI with the specific scalability from bitstreams based on an SEI message. Information on the ROI is included in the SEI message in the form of meta data, and information required for extracting the specific ROI is included in the SEI message.

According to limitations on a terminal or a network or according to a user's selection, ROI ID and scalability of an external or predetermined ROI that is to be extracted is input, and the slice groups corresponding to the scalability layers which are to be extracted are identified by using the mapping information on mapping between the ROI IDs and the slice group IDs in the SEI message which is subject to parsing.

Next, when the slice group included in the requested ROI does not exist in any of the received NAL units, the corresponding NAL units are removed. In addition, when an NAL unit has a resolution higher than the scalability of the requested ROI, the NAL unit is removed.

A bitstream output from the selecting unit 820 is constructed with NAL units which are not removed in the aforementioned operations. The bitstream, which includes the ROI extracted by the selecting unit 820, is also a scalable bitstream.

Figure 9A:
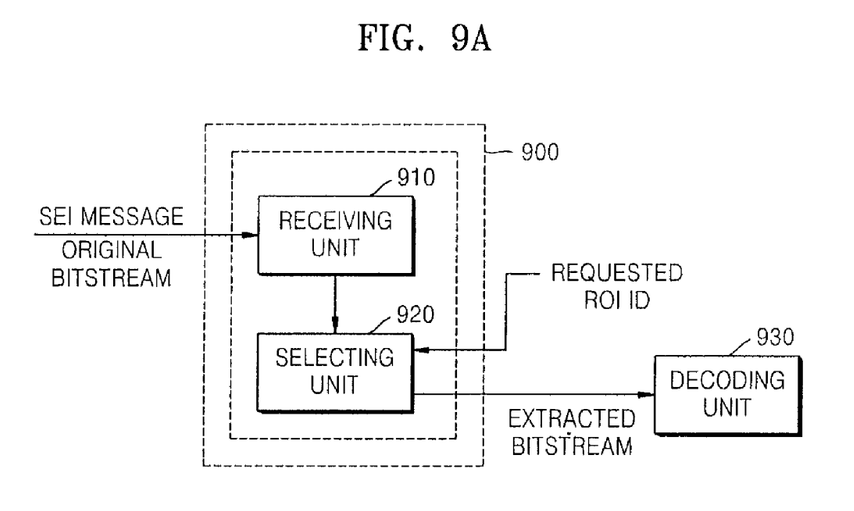
FIG. 9A is a view showing a construction of a selective ROI reconstructing apparatus according to an embodiment of the present invention.

FIG. 9A is a view showing a construction of a selective ROI reconstructing apparatus 900 according to an embodiment of the present invention.

The selective ROI reconstructing unit 900 includes a receiving unit 910 and a selection unit 920 which are substantially equal or similar to the receiving unit 810 and the selecting unit 820 described with reference to FIG. 8. In addition, the selective ROI reconstructing unit 900 includes a decoding unit 930. Since the receiving unit 910 and the selecting unit 920 are equal or similar to those shown in FIG. 8, a detailed description thereof will be omitted.

The decoding unit 930 decodes a bitstream having the ROI extracted by the selecting unit 820 or 920, so that the multiple ROI can be finally decoded in the SVC.

Figure 9B:
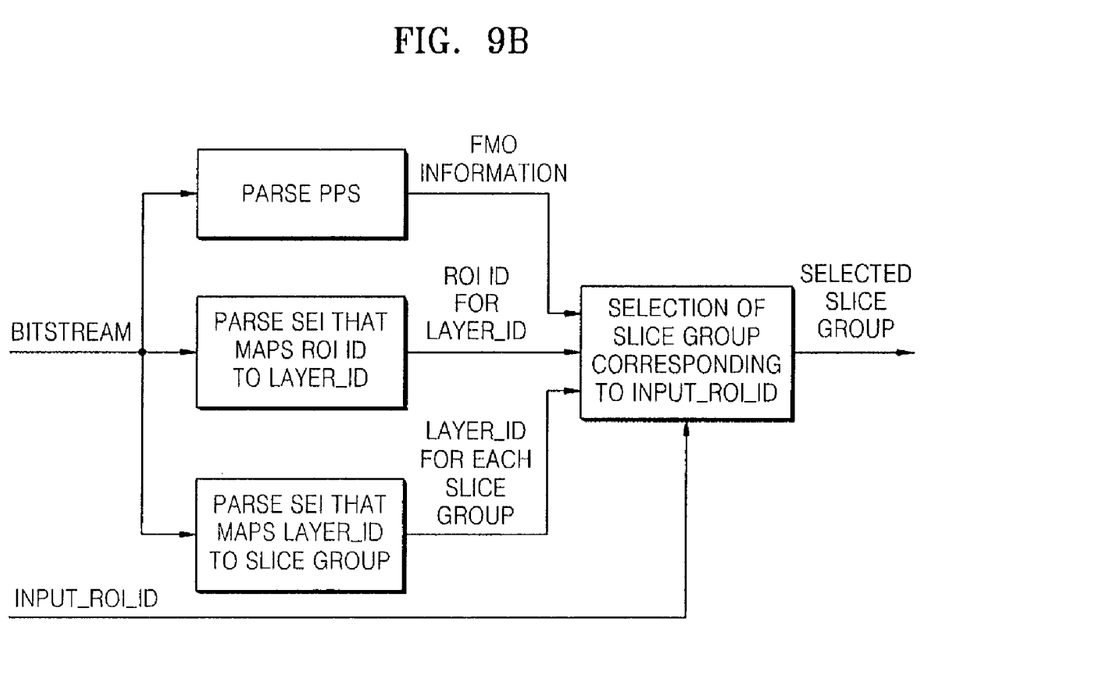
FIG. 9B shows an ROI extracting operation of a selective ROI reconstructing apparatus according to an embodiment of the present invention.

FIG. 9B shows an ROI extracting operation of a selective ROI reconstructing apparatus according to an embodiment of the present invention.

The number of slice groups and geometric information are obtained from the picture parameter set (PPS). Next, the ROI IDs of the layers representing the slice groups are obtained from the SEI including the mapping information on mapping of the layer_IDs to the ROI IDs. Next, information representing a relationship between the slice group IDs and the layer_IDs are obtained from the SEI including the information on the layer_IDs connected to the slice group IDs, so that the slice groups connected to input_ROI_IDs corresponding to the ROI IDs that are to be extracted can be identified by using the slice group IDs. As a result, the associated bitstream can be extracted.

Figure 10A:
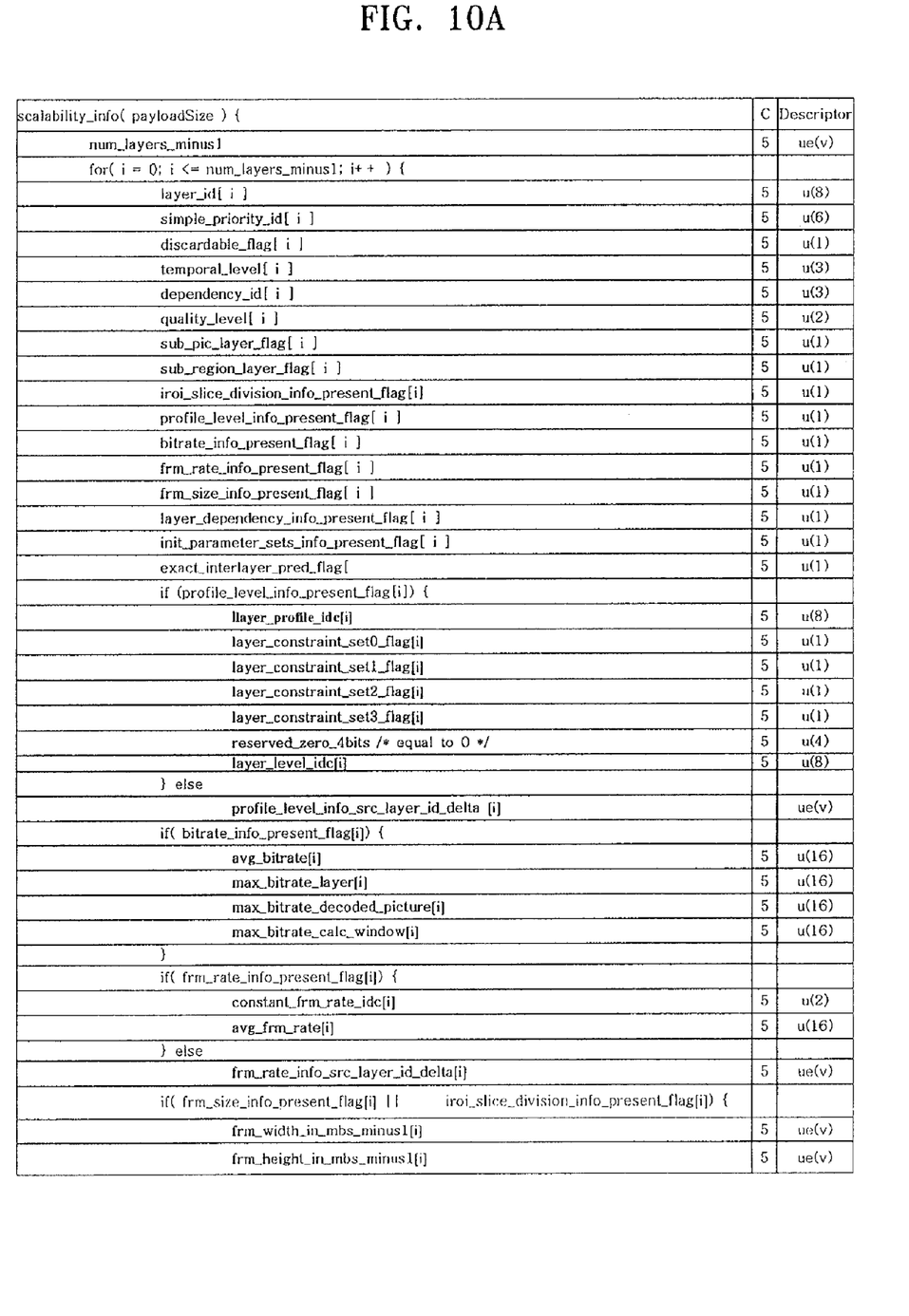
FIGS. 10A to 10C show syntax of an SEI message according to an embodiment of the present invention.
Figure 10B:
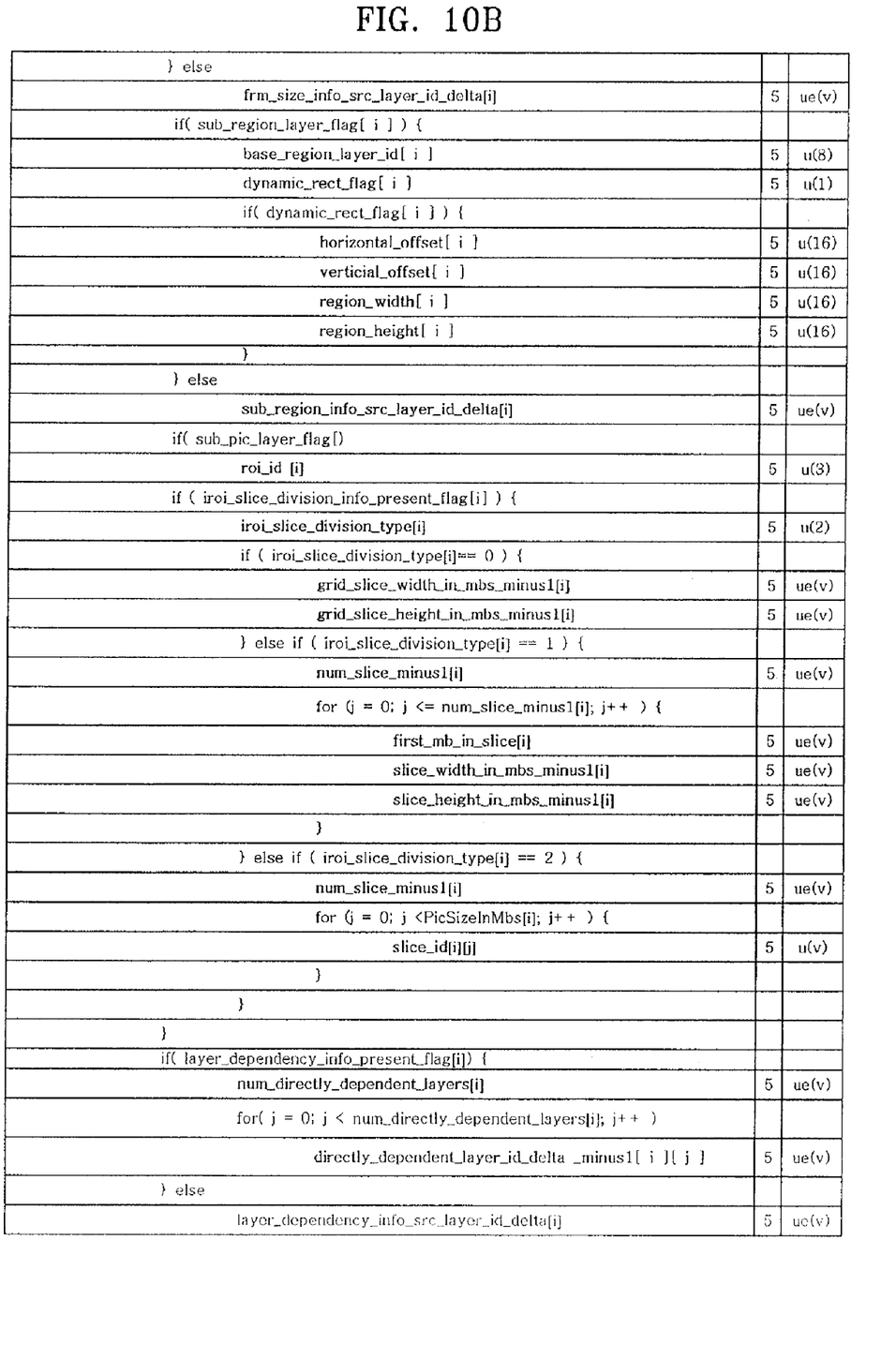
Figure 10C:
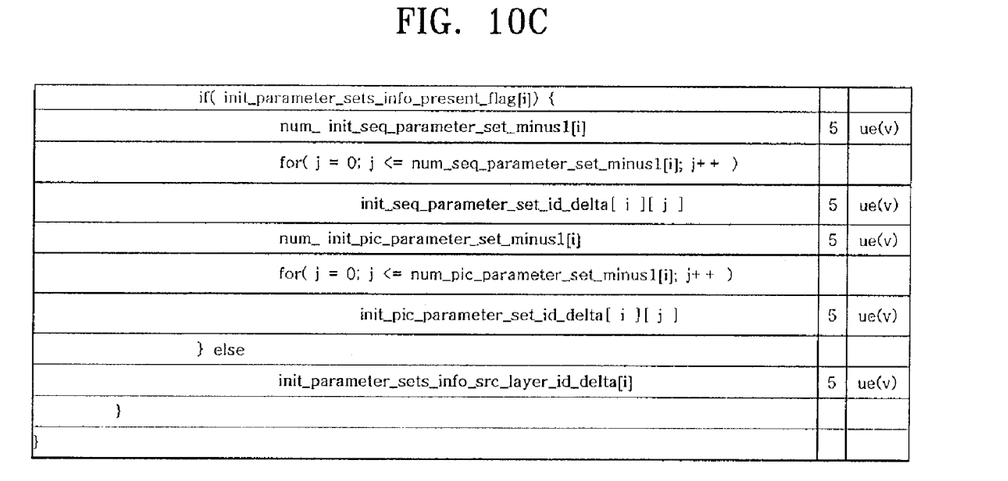

FIGS. 10A to 10C show syntax of an SEI message according to an embodiment of the present invention;

The scalability information SEI provides scalability information of the bitstream. The layers constituting the bitstream are classified into scalable layers according to the scalabilities thereof.

The scalable layer denotes the specific slice group. Information on the scalable layers is described in the scalability information SEI, so that information necessary for the extraction of the bitstream can be provided. In an embodiment of the present invention, the ROI ID is allocated to the scalable layer for a specific ROI, so that the bitstream having the specific ROI can be extracted.

The scalable layer denoted by a sub_pic_layer_flag value of 1 indicates that a slice group is the slice group representing the ROI. When the sub_pic_layer_flag value is 1, the ROI ID is recorded, so that an ROI is the ROI of the specific slice group.

Figure 11:
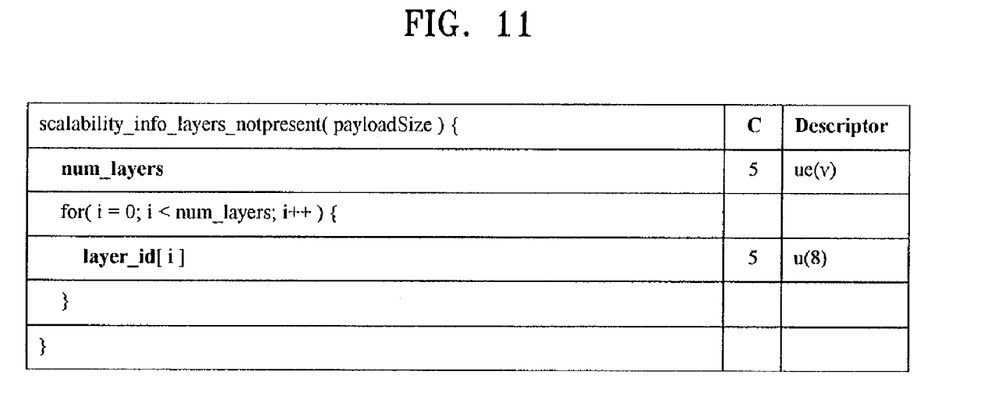
FIG. 11 shows an example of syntax of an SEI message according to an embodiment of the present invention.

FIG. 11 shows alternative the scalability information SEI that contains ROI related information. When an ROI exists in a bitstream, a roi_flag could be used as a signal instead of sub_pic_layer_flag. roi_flag value is set to 1 so as to indicate that the ROI exists in the bitstream. In addition, a value of the number of ROI minus 1 is set to num_rois_minus__1. When the ROI is defined, two or more slice groups exist in one video.

In this case, the layers corresponding to the ROIs are grouped, so that substreams can be defined. The number of substreams corresponding to the ROIs minus 1 is set to nun_component_substreams_minus_1. IDs are allocated to the substream, and the IDs are stored in a component_substream_id array.

Information on the scalable layers constituting the substreams is additionally described, so that the scalability information of the actual slice groups can be provided. In an embodiment of the present invention, the roi_flag, the substream, the nun_component_substreams_minus_1, and component_substream_id are stored as ROI information.

Figure 12:
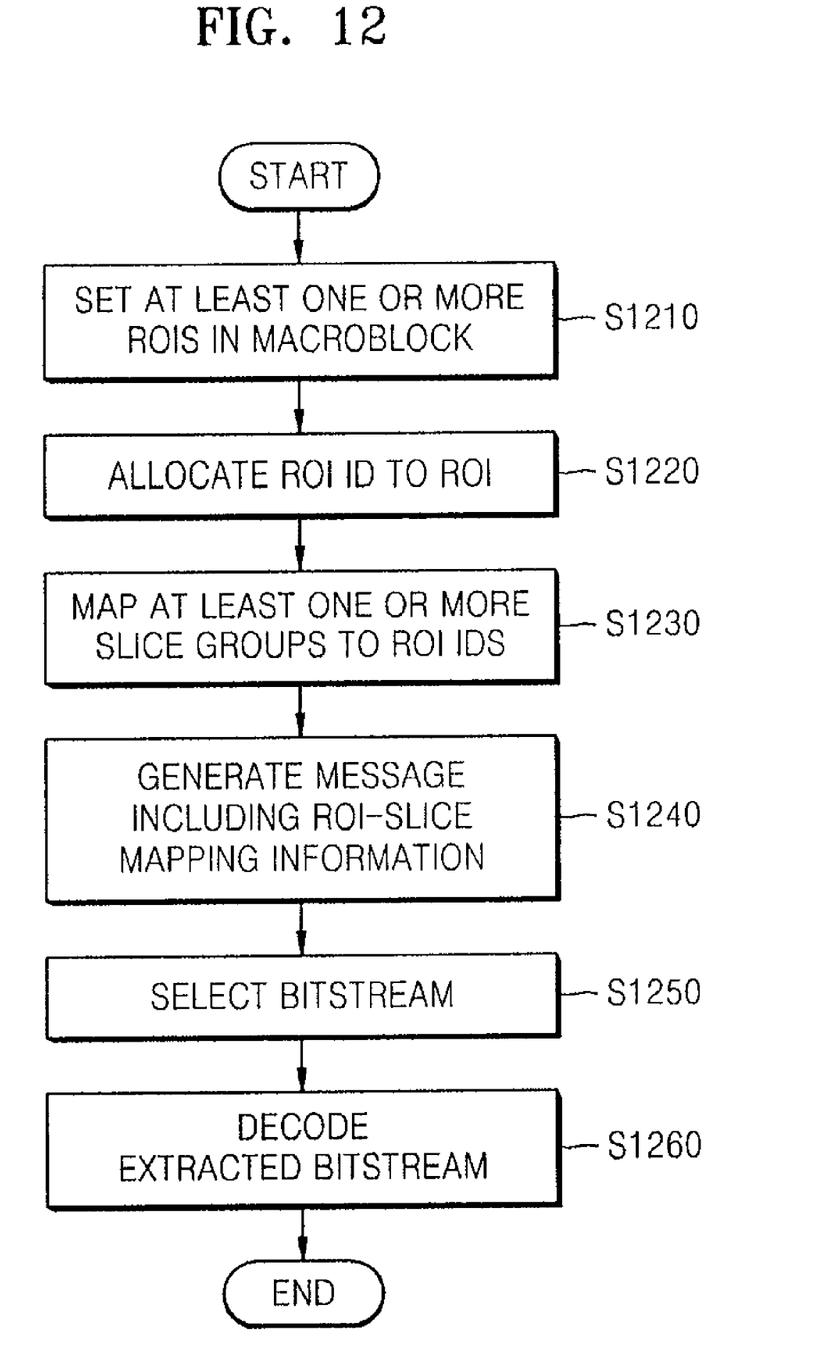
FIG. 12 is a flowchart showing operations of implementing a multiple ROI in scalable video coding (SVC).

FIG. 12 is a flowchart showing operations of implementing multiple ROIs in SVC.

The implementation of the multiple ROIs in SVC is performed as follows.

At least one or more ROIs are set by using multiple slice groups, and the ROI IDs are allocated to the ROIs (Operations S1210 and S1220).

Next, at least one or more slice group IDs are mapped to at least one or more ROI IDs (Operation S1230). When there is an overlapped region between the ROIs, the slice group IDs are allocated to the overlapped region and a region of the ROI that does not overlap other ROIs. (Operation S1230).

After the mapping of the ROI IDs to the slice group IDs is completed, an SEI message including the ROI-associated information, the slice-group-associated information, mapping information on mapping of the ROI IDs to the one or more slice group IDs, and scalability information is generated (Operation S1240).

A bitstream having a specific ROI with a specific scalability is selected from bitstreams based on the SEI message (Operation S1250). More specifically, a slice group corresponding to a slice group ID which is mapped to the specific ROI ID from the bitstream is detected based on the information in the SEI message.

An NAL unit where the detected slice group does not exist is removed, and an NAL unit which has scalability higher than a specific scalability is removed. After that, the remaining NAL units are extracted as a bitstream. The extracted bitstream is decoded (Operation S1260).

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A multiple ROI (region of interest) information setting method for scalable video, the method comprising:
    setting at least one ROI in a frame, and allocating ROI identification number to the each of at least one ROI;
    mapping the ROI identification number to a layer identification number; and
    mapping at least one or more slice group identification numbers to the layer identification number,
    wherein an SEI (supplemental enhancement information) message comprises mapping information between the ROI identification number to the layer identification number and mapping information between the ROI identification number and the at least one or more slice group identification numbers.

2. The method of claim 1, wherein the SEI message comprises a scalable information SEI message, a sub-picture scalable layer SEI message, and a motion-constrained slice group set SEI message.

3. The method of claim 1, wherein, in the mapping of the ROI identification number to the layer identification number, meta data indicating the mapping information between the ROI identification number to the layer identification number is included in the scalable information SEI message.

4. The method of claim 1, wherein, in the allocating of ROI identification number, meta data indicating information regarding the allocated ROI identification number and the at least one or more slice group identification numbers allocated to the layer identification number is included in the sub-picture scalable layer SEI message and the motion-constrained slice group set SEI message.

5. The method of claim 1, wherein the setting of least one or more ROIs by using H.264 multiple slice group flexible macroblock ordering (FMO).

6. An ROI parsing method for scalable video, the method comprising:
    acknowledging a mapping relationship between an ROI identification number and a layer identification number from a SEI message;
    determining at least one or more slice group identification numbers corresponding to the layer identification number from the SEI message; and
    determining a location of a corresponding slice group in a PPS (picture parameter set) based on the at least one or more slice group identification numbers.

7. The method of claim 6, wherein the mapping relationship between the ROI identification number and the layer identification number is acknowledged only with respect to a layer having 1 as a sub-pic-layer-flag value by determining the sub-pic-layer-flag value included in the SEI message.

8. The method of claim 7, wherein the SEI message is a scalable information SEI message.

9. The method of claim 7, wherein the sub-pic-layer-flag value is described per layer, and an ROI exists in a corresponding layer only when the sub-pic-layer-flag value is 1.

10. The method of claim 6, wherein the SEI message used to determine the at least one or more slice group identification numbers is a sub-picture scalable layer SEI message and a motion-constrained slice group set SEI message.

11. The method of claim 6, wherein the determining of the location comprises: determining addresses of macroblocks in upper left and lower right corners of each slice group based on the at least one or more slice group identification numbers.

12. An ROI parsing method, the method comprising:
    acknowledging a mapping relationship between a layer identification number and an ROI identification number of a layer including an ROI from a scalable information SEI message;
    determining at least one or more slice group identification numbers corresponding to the layer identification number from the sub-picture scalable layer SEI message, and a motion-constrained slice group set SEI message; and
    determining a location of a corresponding slice group in a PSS based on the at least one or more slice group identification numbers.

13. The method of claim 12, wherein the mapping relationship between the ROI identification number and the layer identification number is acknowledged only with respect to a layer having 1 as a sub-pic-layer-flag value by determining the sub-pic-layer-flag value included in the SEI message.

14. The method of claim 13, wherein the sub-pic-layer-flag value is described per layer, and an ROI exists in a corresponding layer only when the sub-pic-layer-flag value is 1.

15. The method of claim 12, wherein the determining of the location comprises: determining addresses of macroblocks in upper left and lower right corners of each slice group based on the at least one or more slice group identification numbers.

16. The ROI selecting apparatus of claim 10, wherein the message is an SEI (supplemental enhancement information) message in H.264/AVC.

17. A selective ROI reconstructing apparatus comprising:
a receiving unit which receives a bitstream having a message including mapping information on mapping which allocates at least one or more slice groups to at least one or more ROIs set, ROI-associated information, slice-group-associated information, and scalability information;
a selecting unit which selects a bitstream corresponding to a specific ROI with a specific scalability from the bitstreams based on the message; and a decoding unit which decodes the selected bitstream.

18. The selective ROI reconstructing apparatus of claim 17, wherein the mapping information includes information on allocation of ROI identification numbers to the at least one or more ROIs and information on allocation of slice group identification numbers representing the at least one or more slice groups to the ROI identification numbers.

19. The selective ROI reconstructing apparatus of claim 18, wherein, when there is an overlapped region between the ROIs, the slice group identification numbers are allocated to the overlapped region and a region of the ROI that does not overlap other ROIs.

20. The selective ROI reconstructing apparatus of claim 18, wherein the selecting unit comprises:
a detecting unit which detects a slice group corresponding to a slice group identification number which is mapped to the specific ROI identification number from the bitstream based on the information in the message; and
an extracting unit which removes an NAL unit where the detected slice group does not exist and an NAL unit which has scalability higher than a specific scalability.

21. The selective ROI reconstructing apparatus of claim 17, wherein the macroblock is set as at least one or more ROIs by using H.264 multiple slice group flexible macroblock ordering (FMO).

22. The selective ROI reconstructing apparatus of claim 17, wherein the macroblock is included in a frame which is included in the scalable video bitstream.

23. The selective ROI reconstructing apparatus of claim 17, wherein the message is an SEI (supplemental enhancement information) message in H.264/AVC.

24. A multiple ROI (region of interest) setting method comprising:
(a) setting at least one or more ROIs and allocating ROI identification number to the each of ROIs;
(b) mapping at least one or more slice group identification numbers to at least one or more ROI identification numbers; and
(c) generating a message including ROI-associated information, slice-group-associated information, mapping information on mapping of the ROI identification number to the at least one or more slice group identification numbers and scalability information.

25. The multiple ROI setting method of claim 24, further comprising (d) selecting a bitstream having a specific ROI with a specific scalability from bitstreams based on the message.

26. The multiple ROI setting method of claim 24, wherein, in (b), when there is an overlapped region between the ROIs, the slice group identification numbers are allocated to the overlapped region and to a region of the ROI that does not overlap other ROIs.

27. The multiple ROI setting method of claim 25, wherein, in (d), a slice group corresponding to a slice group identification number which is mapped to the specific ROI identification number is detected from the bitstream based on the information in the message wherein an NAL unit where the detected slice group does not exist is removed and an NAL unit which has a scalability higher than a specific scalability is removed.

28. The multiple ROI setting method of claim 24, wherein, in (a), the macroblock is set as at least one or more ROIs by using H.264 multiple slice group flexible macroblock ordering (FMO).

29. The multiple ROI setting method of claim 24, wherein the message is an SEI (supplemental enhancement information) message in H.264/AVC.

30. The multiple ROI setting method of claim 24 or 29, wherein the message is encoded and included in a bitstream of an encoder.

31. The multiple ROI setting method of claim 24, wherein the macroblock is included in a frame which is included in the scalable video bitstream.

32. The multiple ROI setting method of claim 24, wherein the message includes the number of ROIs, ROI identification numbers, slice group identification numbers, sizes and locations of slice groups, and mapping information on mapping of the ROI identification numbers to at least one or more slice group identification numbers.

33. An ROI selecting method comprising:
(a) receiving a bitstream having a message including mapping information on mapping which allocates at least one or more slice groups to at least one or more ROIs set, ROI-associated information, slice-group-associated information and scalability information; and
(b) selecting a bitstream corresponding to a specific ROI with a specific scalability from the bitstreams based on the message,
wherein the mapping information includes information on allocation of ROI identification numbers to the at least one or more ROIs and information on allocation of slice group identification numbers representing the at least one or more slice groups to the ROI identification numbers.

34. The ROI selecting method of claim 33, wherein, when there is an overlapped region between the ROIs, the slice group identification numbers are allocated to the overlapped region and a region of the ROI that does not overlap other ROIs.

35. The ROI selecting method of claim 33, wherein (b) comprises:
(b1) detecting a slice group corresponding to a slice group identification number which is mapped to the specific ROI identification number from the bitstream based on the information in the message; and
(b2) removing an NAL unit where the detected slice group does not exist and an NAL unit which has a scalability higher than a specific scalability.

36. The ROI selecting method of claim 33, wherein the at least one or more ROIs are set by using H.264 multiple slice group flexible macroblock ordering (FMO).

37. The ROI selecting method of claim 33, wherein the bitstream is a scalable video bitstream.

38. The ROI selecting method of claim 33, wherein the message is an SEI (supplemental enhancement information) message in H.264/AVC.

39. A selective ROI reconstructing method comprising:
  (a) receiving a bitstream having a message including mapping information on mapping which allocates at least one or more slice groups to at least one or more ROIs set ROI-associated information, slice-group-associated information, and scalability information;
  (b) selecting a bitstream corresponding to a specific ROI with a specific scalability from the bitstreams based on the message; and
  (c) decoding the selected bitstream,
  wherein the mapping information includes information on allocation of ROI identification numbers to the at least one or more ROIs and information on allocation of slice group identification numbers representing the at least one or more slice groups to the ROI identification number.

40. The selective ROI reconstructing method of claim 39, wherein, when there is an overlapped region between the ROIs, the slice group identification numbers are allocated to the overlapped region and a region of the ROI that does not overlap other ROIs.

41. The selective ROI reconstructing method of claim 39, wherein (b) comprises:
  (b1) detecting a slice group corresponding to a slice group identification number which is mapped to the specific ROI identification number from the bitstream based on the information in the message; and
  (b2) removing an NAL unit where the detected slice group does not exist and an NAL unit which has a scalability higher than a specific scalability.

42. The selective ROI reconstructing method of claim 39, wherein the at least one or more ROIs are set by using H.264 multiple slice group flexible macroblock ordering (FMO).

43. The selective ROI reconstructing method of claim 39, wherein the bitstream is a scalable video bitstream.

44. The selective ROI reconstructing method of claim 39, wherein the message is an SEI (supplemental enhancement information) message in H.264/AVC.

45. A computer readable recording medium having embodied thereon a computer program of any one of claims 24 to 29, 31 to 32, 33-38, and 39 to 44.

* * * * *